United States Patent [19]

Fushiki

[11] Patent Number: 5,255,102
[45] Date of Patent: Oct. 19, 1993

[54] OPTICAL DISC PLAYBACK DEVICE HAVING UNIFORM FRAME INTERVAL TRACK JUMP BASED ON DISC ROTATION ANGLE

[75] Inventor: Tatsuo Fushiki, Hamamatsu, Japan

[73] Assignee: Yamaha Corporation, Hamamatsu, Japan

[21] Appl. No.: 416,274

[22] Filed: Sep. 29, 1989

[30] Foreign Application Priority Data

Sep. 30, 1988 [JP] Japan .................................. 63-247158
Sep. 30, 1988 [JP] Japan .................................. 63-247159

[51] Int. Cl.⁵ .............................................. H04N 5/76
[52] U.S. Cl. .................................... 358/342; 358/322; 358/312; 360/10.1; 369/58
[58] Field of Search ............... 358/342, 335, 338, 337, 358/907, 312, 320–322; 369/32, 44.28, 54, 58; 360/10.1, 33.1

[56] References Cited

U.S. PATENT DOCUMENTS

| | | | |
|---|---|---|---|
| 4,809,094 | 2/1989 | Akiyama | 358/907 |
| 4,814,897 | 3/1989 | Kojima et al. | 358/342 |
| 4,835,623 | 10/1989 | Okano et al. | 358/342 |
| 4,845,572 | 7/1989 | Yasuda | 358/342 |
| 4,858,030 | 8/1989 | Oku et al. | 358/342 |
| 4,887,253 | 12/1989 | Tateishi | 358/907 |
| 5,001,570 | 3/1991 | Tagawa | 358/907 |

Primary Examiner—Tommy Chin
Assistant Examiner—Khoi Truong
Attorney, Agent, or Firm—Spensley Horn Jubas & Lubitz

[57] ABSTRACT

An optical disc playback device for playing back video data employs a rotation signal generation circuit for generating a signal at a period of a rotation angle provided by dividing one rotation of a disc motor to detect a record position on a disc of picture data stored in a picture memory. A laser beam spot is caused to jump a predetermined number of tracks each time a position on the disc has a specific relation to the record position in response to a signal generated by the rotation signal generation circuit whereby a still picture playback and a still picture shifting can be made frame by frame. Further, trace angle data necessary for reading one picture data from the disc and a track jump amount necessary for achieving a multiplying number of fast/slow playback speed set on the basis of this trace angle data are obtained in accordance with detected recorded angle amount data and, when computed trace angle amount has been detected by a rotation angle generation circuit, the laser beam spot is caused to jump a computed track jump amount whereby change in a picture in a fast/slow playback can be made uniform regardless of the circumferential position on the disc.

7 Claims, 15 Drawing Sheets

OPTICAL DISC PLAYBACK DEVICE HAVING UNIFORM FRAME INTERVAL TRACK JUMP BASED ON DISC ROTATION ANGLE

BACKGROUND OF THE INVENTION

This invention relates to an optical disc playback device for playing back video data such as an LV (Laser Vision Disc) player or a CDV (Compact Disc with video) player and, more particularly, to an optical disc playback device capable of performing a still picture playback or still picture shifting of a CLV (constant linear velocity) disc frame by frame. The invention relates also to an optical disc playback device capable of realizing a uniform interval of changing of a picture throughout the entire circumferences of the disc from the innermost circumference to the outermost circumference during a fast/slow playback of a CLV disc.

In a prior art LV player, a still picture playback or a still picture shifting used to be made in a CAV (constant angular velocity) disc only. There has recently been developed an LV player which can perform a still picture playback or a still picture shifting in a CLV disc by incorporating a picture memory therein.

A still picture playback by using a picture memory is realized by storing picture data for one field or one frame in the picture memory and reading out this picture data repeatedly. A still picture shifting is realized by rewriting, each time a still picture shifting operation is made, contents of the picture memory by succeeding picture data (in the case of a forward still picture shifting) or preceding picture data (in the case of a backward still picture shifting) and reading out this data repeatedly.

In the prior art LV or CDV player, a picture memory writing control and an optical pickup jump control in a still picture playback or still picture shifting are made by utilizing a rotation signal which is obtained once per one rotation of a disc motor. More specifically, in a still picture playback, picture data for one field (or one frame) obtained for the first time after a still picture command has been given and a rotation signal has been supplied is stored in a picture memory and this data is repeatedly read out as still picture data. During the still picture playback, a tracking actuator of an optical pickup is provided with a jump pulse of a backward direction each time the rotation signal is given whereby the optical pickup jumps one track in the backward direction (i.e., toward the innermost circumference) and continues to trace the same track.

When a still picture shifting command has been given in a still picture playback mode, the optical pickup advances to trace a next track without making a jump upon receipt of the rotation signal if the command is one in a forward direction and the contents of the picture memory are rewritten by picture data for one field (or one frame) which is obtained first and this data is repeatedly read out. Upon finishing of the still picture shifting in the forward direction, the mode is brought to the still picture playback mode again and the jump pulse in a backward direction is given each time the rotation signal is supplied whereby the optical pickup jumps one track behind to trace the same track.

In the case of a still picture shifting in a backward direction, the optical pickup jumps two tracks in the backward direction (i.e., toward the innermost circumference) upon receipt of the rotation signal and the contents of the picture memory are rewritten by picture data for one field (or one frame) which is obtained first and this data is repeatedly read out. Upon finishing of the still picture shifting in the backward direction, the mode is brought to the still picture playback mode again and a jump signal in the backward direction is given each time the rotation signal is supplied whereby the optical pickup jumps one track behind to trace the same track.

A fast/slow playback is another type of trick play mode in an optical disc playback device. In the fast/slow playback, an optical disc is played back with a playback speed which is different from a normal playback speed. The fast/slow playback is realized by playing back a disc while performing a track jump at a predetermined interval. The multiplying number of fast or slow playback speed can be changed by changing the amount of one tracing, direction of jump and number of tracks to be jumped.

In a prior art LV player, fast/slow playback used to be made in a CAV disc only. There has recently been developed an LV player capable of performing fast/slow playback in a CLV disc by incorporating a picture memory therein.

In the prior art LV player and CDV player, a picture memory writing control and an optical pickup jump control in a fast/slow playback mode are made by utilizing a rotation signal obtained once per one rotation of a disc motor. More specifically, in a treble speed fast playback in a forward direction, for example, a tracking actuator of an optical pickup is provided with a jump pulse in a forward direction to jump two tracks toward the outermost circumference and picture data for one field (or one frame) obtained for the first time after the jump is stored in the picture memory and this data is repeatedly read out.

In an LV of a CLV disc type, picture data of one frame is recorded in one circumference in the innermost circumference of the disc and picture data of three frames is recorded in one circumference in the outermost circumference of the disc. In the prior art still picture playback and still picture shifting, one frame only is used for one circumference of the disc and, as a result, change of the picture in the still picture shifting becomes more coarse as the still picture shifting proceeds towards the outermost circumference of the disc (for example, only 10 frames are utilized in the outermost circumference notwithstanding that there are 30 frames per second).

In the fast/slow playback also, the same number of tracks are jumped for one circumference in the disc in the prior art LV player regardless of whether it is the innermost circumference or the outermost circumference with a result that, as the fast/slow playback proceeds toward the outermost circumference, the interval of jump becomes longer and, accordingly, the number of frames to be jumped by one jump becomes larger and change of the picture becomes more coarse.

It is, therefore, an object of the invention to provide an optical disc playback device capable of performing a still picture playback and a still picture shifting in a CLV disc frame by frame.

It is another object of the invention to provide an optical disc playback device capable of realizing a uniform change in the picture during a fast/slow playback of a CLV disc throughout the entire circumferences of the disc.

SUMMARY OF THE INVENTION

An optical disc playback device according to the invention which performs a still picture playback control comprises a picture memory storing picture data reproduced from an optical disc, memory control means for storing, when a still picture command has been given, picture data which is being reproduced in the picture memory and reading out the picture data repeatedly, rotation signal generation means for generating a signal, at a period of a rotation of a rotation angle provided, by dividing one rotation of a disc motor by a predetermined number, and a system control means for detecting, when the still picture command has been given, a record position on the optical disc at which the picture data stored in the picture memory is recorded and supplying a jump pulse to a tracking actuator of an optical pickup each time a position on the optical disc having a specific relation with the record position has been detected in response to the signal generated by the rotation signal generation means thereby to cause a laser beam spot to jump a predetermined number of tracks in a backward direction.

According to one aspect of the invention, the system control means detects, when a still picture shifting command in a forward direction has been given in a still picture playback mode, a position on the optical disc at which picture data which is one frame after the picture data stored in the picture memory is recorded in response to the signal generated by the rotation signal generation means and the memory control means writes this picture data in the picture memory and reads it out repeatedly.

According to another aspect of the invention, the optical playback device further comprises recorded data angle detection means for detecting, in response to the signal generated by the rotation signal generation means, an angle of recording on the optical disc of the picture data stored in said picture memory in the still picture playback mode and, further, the system control means detects, when a still picture shifting command in a backward direction has been given, a position on the optical disc at which picture data of one frame before the picture data stored in the picture memory is recorded from the detected recorded data angle to cause the optical pickup to perform track jump to a position before said position, and the memory control means writes the picture data in the picture memory and reads it out repeatedly upon reaching the recorded position of the picture data.

According to still another aspect of the invention, an optical disc playback device comprises a picture memory storing picture data reproduced from an optical disc, memory control means for storing, when a fast/slow playback command has been given, picture data which is reproduced at each track jump in the picture memory and reading it out repeatedly, rotation signal generation means for generating a signal at a period of a rotation angle provided by dividing one rotation of a disc motor by a predetermined number, recorded data angle detection means for detecting, when the fast/slow playback command has been given, recorded data angle on the optical disc of picture data stored in the picture memory in response to the signal generated by the rotation signal generation means, and system control means for computing, in accordance with the detected recorded data angle, trace angle data necessary for reading one picture data from the optical disc and a track jump amount necessary for achieving a multiplying number of fast/slow playback speed set on the basis of this trace angle data and, when the computed trace angle data has been detected by said rotation signal generation means, causing an optical pickup to jump the computed track jump amount.

In the prior art LV player, as described above, if a plurality of picture data are recorded on one track, positions at which the respective picture data are recorded cannot be distinguished one from another and, accordingly, a still picture of one frame only can be obtained for one track by using a rotation signal provided once per one rotation. In contrast, according to the present invention, rotation signal generation means for generating a signal at a period of a rotation angle provided by dividing one rotation of a disc motor by a predetermined number is employed to detect a record position on the optical disc of picture data stored in the picture memory and the laser beam spot is caused to jump a predetermined number of tracks each time a position on the optical disc having a specific relation with the record position is detected in response to the signal generated by the rotation signal generation means whereby data concerning the record position on the optical disc of the picture data stored in the picture memory is held as the track jump position. Accordingly, record positions of picture data before and after this picture data can be distinguished one from another so that a still picture for each frame can be obtained and still picture shifting can be made frame by frame even if a plurality of picture data are recorded in one track.

Further, according to the invention, the principle in a CLV disc that a recorded data angle of one picture data on an optical disc differs one from another depending upon a circumference on which the data is recorded (i.e., such angle is the largest in the innermost circumference and the smallest in the outermost circumference) is utilized and trace angle data necessary for reading one picture data from the optical disc and a track jump amount necessary for achieving a multiplying number of fast/slow playback speed set on the basis of this trace angle data are obtained in accordance with the detected recorded data angle and, when the computed trace angle data has been detected by the rotation angle generation means, the laser beam spot is caused to jump the computed track jump amount. By this arrangement, change in the picture in a fast/slow playback in a CLV disc can be made uniform regardless of the circumferential position on the disc.

Embodiments of the invention will now be described with reference to the accompanying drawings.

BRIEF DESCRIPTION OF THE DRAWINGS

In the accompanying drawings,

FIGS. 3 to 5 are diagrams showing a tracing operation of the laser beam spot in a still picture playback mode in a case where an LV of a CLV disc type is used in the device shown in FIG. 1 in which FIG. 3 shows the tracing operation at the innermost circumference of the disc, FIG. 4 that at the middle portion of the disc and FIG. 5 that at the outermost circumference of the disc;

FIGS. 8 to 10 are diagrams showing the tracing operation of a laser beam spot in a case where an LV of a CLV disc type which has been converted from picture data of the movie film to picture data of the television is used in the device shown in FIG. 1 in which FIG. 8 shows the still picture playback mode, FIG. 9 a state when a still picture shifting command in a forward direction has been given in the state of FIG. 8 and FIG. 10 a state when a still picture playback command in a backward direction has been given in the state of FIG. 8;

FIGS. 13 to 15 are diagrams showing an example of tracing operation of a laser beam spot during the fast/slow playback mode in which FIG. 13 shows the tracing operation at the innermost circumference, FIG. 14 that at the middle portion and FIG. 15 that at the outermost circumference of the disc respectively.

DESCRIPTION OF PREFERRED EMBODIMENTS

Embodiment 1

Figure 1:
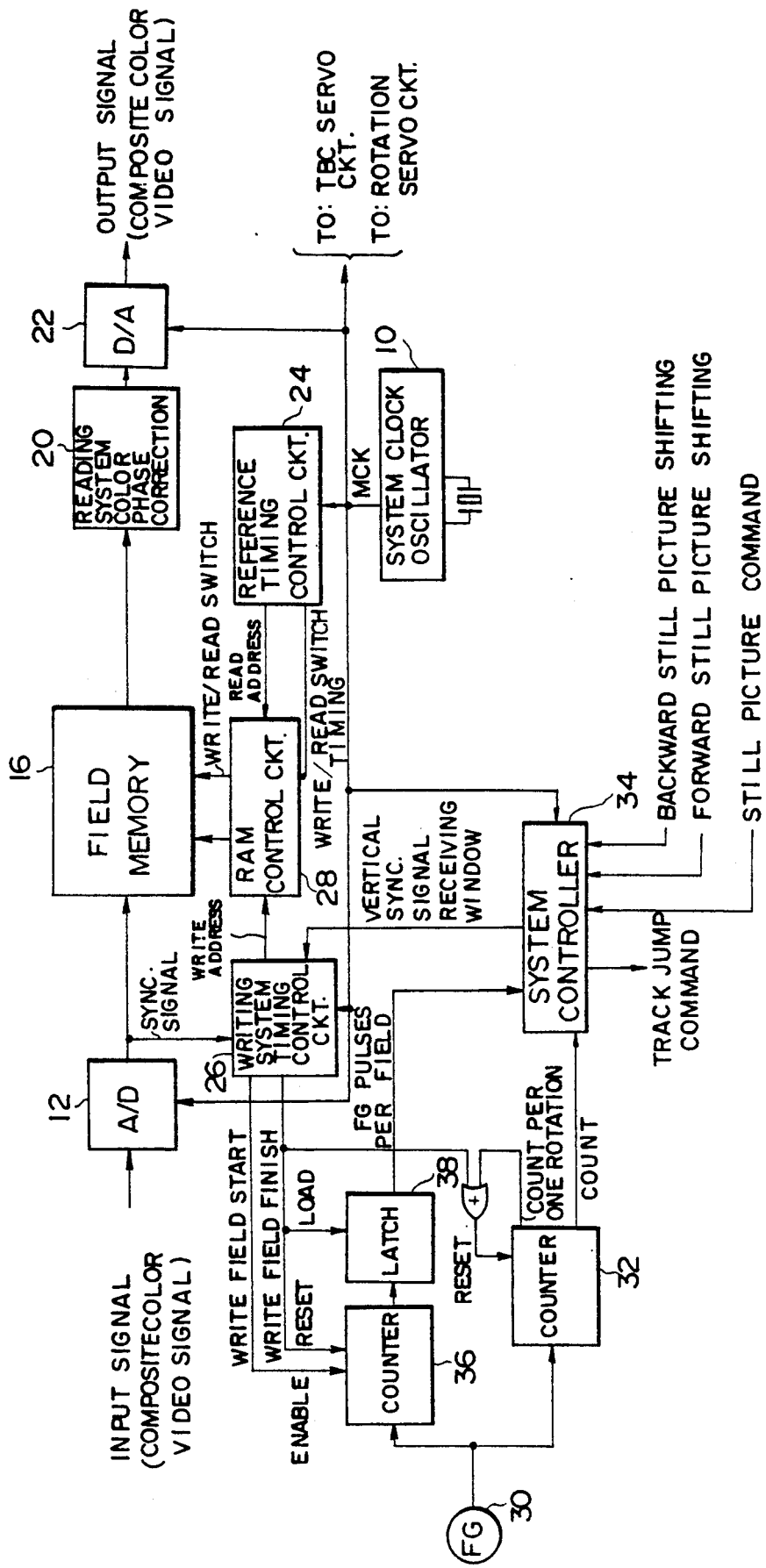
FIG. 1 is a block diagram showing an embodiment of the invention for performing a still picture playback and a still picture shifting.

An embodiment of the invention for performing a still picture playback and a still picture shifting is shown in FIG. 1. In FIG. 1, an input composite color video signal (an NTSC signal obtained by demodulating a reproduced signal from the disc in video) is analog-to-digital converted by an analog-to-digital converter 12. Picture data converted to digital data is applied to a field memory 16.

The field memory 16 consists of a RAM and has a capacity for storing picture data of substantially one field. In a continuous playback mode (i.e., normal playback mode), input picture data is sequentially overwritten and stored in the memory at corresponding positions with the first field and second field alternately and read out sequentially. Data memory area for the first field and the second field is used commonly so that each memory area of the first through the 262nd scanning lines for the first field is used also for memory area of the 264th through the 525th scanning lines for the second field.

The field memory 16 need not have a capacity for storing all picture data for one field but, for example, vertical and horizontal synchronizing signal portions may be added to picture data read from the field memory 16 later. By this arrangement, the memory capacity can be reduced.

The field memory 16 is used commonly for various playback modes other than a continuous playback mode including a fast/slow playback mode and a still picture playback mode. These various playback modes are realized by writing control in the field memory 16. Reading control is constant regardless of the type of playback mode and data of the entire memory are sequentially read out field by field.

A still picture is realized by stopping writing in the field memory 16 and repeatedly reading out data in the field memory 16. In this embodiment, a still picture is made by storing picture data of the second field in the field memory 16.

Data read from the field memory 16 is applied to a reading system color phase correction circuit 20. The reading system color phase correction circuit 20 corrects the phase of color subcarrier of picture data field by field so that the phase of the color subcarrier of the picture data read from the field memory 16 becomes continuous between respective fields. In a still picture playback and a fast/slow playback, picture data for one field (second field) stored in the field memory 16 is read out commonly for the first field and the second field. Since, however, the color subcarrier phase pattern of the first field and that of the second field are different from each other by a half period of the color subcarrier, the picture data is shifted by 180 degrees of the color subcarrier at each shifting from the first field to the second field. In a continuous playback mode also, the color subcarrier of output data of the field memory 16 and the reference color subcarrier sometimes are servo locked in opposite phase to each other. In this case, read out data of the field memory 16 is continuously shifted by a half period of the color subcarrier.

Output data of the reading system color phase correction circuit 20 is converted to analog data by a digital-to-analog converter 22 and thereafter is supplied to a television receiver for playback on a television screen.

A system clock oscillator 10 oscillates a master clock MCK for controlling the entire LV player. In a state where rotation servo and TBC (time base corrector) servo are locked, the color subcarrier of the input composite color video signal is synchronized in frequency with this master clock MCK. The frequency of the master clock MCK is set at 2N fsc where fsc represents the color subcarrier frequency and N represents a positive integer, for example, N=2, i.e., 4 fsc. In this case, the analog-to-digital converter 12 samples the input NTSC composite video signal with a frequency which is four times as high as the color subcarrier by using this master clock MCK.

A reference timing control circuit 24, a writing system timing control circuit 26 and a RAM control circuit 28 constitute the memory control means. The reference timing control circuit 24 produces a write/read switch timing signal and a read address signal in response to the master clock MCK. The write/read switch timing signal is a signal for switching the field memory 16 between a write mode and a read mode and is produced in such a manner that, for example, a write mode is achieved at falling of the master clock MCK and a read mode at rising thereof.

. The read address signal is a signal indicating a read address and is given as a value obtained by counting the master clock MCK by using a reference synchronizing signal of the output system as reference.

A writing system timing control circuit 26 produces a write address signal. The write address signal is a signal indicating a write address of the field memory 16. By changing the manner of giving this write address signal in response to various playback mode commands, these playback modes are achieved. For example, during the continuous playback mode, i.e., normal playback mode, the master clock MCK is counted by using a playback synchronizing signal as reference and the counted value as the write address is sequentially supplied to the RAM control circuit 28, and this operation is repeated each time the playback synchronizing signal is given. During a still picture playback, the master clock MCK is counted by using the playback synchronizing signal as reference and the counted value is supplied to the RAM control circuit 28 as a write address for one field and thereafter the write command is stopped. The writing system timing control circuit 26 also produces signals at start timing and end timing of a field to be written in the field memory 16.

The RAM control circuit 28 provides a write/read command and address command to be given to the field memory 16. The write/read command is produced in response to the write/read switch timing signal from the reference timing control circuit 24 to switch the mode of the field memory 16 and thereby to supply an address signal corresponding to the switched mode to the field memory 16 for performing writing or reading.

An FG (rotation signal generation means) 30 is coupled to the disc motor and generates a predetermined number of pulses at one rotation of the disc motor. The FG 30 is used for performing rough control of the disc motor. In this embodiment, the FG 30 is utilized also for detecting a record position on the disc of the picture data stored in the field memory 16.

A counter 32 is reset by an end timing signal of the write field produced by the writing system timing control circuit 26 and counts the output pulse of the FG 30. The counter 32 is reset each time the count has reached a value corresponding to one rotation.

A system controller 34 which constitutes the system control means produces a command for jumping one track in a backward direction (i.e., toward the innermost circumference) each time the counter 32 is reset in the still picture playback mode. During the still picture playback mode, the laser beam spot jumps one track toward the innermost circumference each time it passes over a record position on the disc at which the field of picture data written in the field memory 16 ends and thereby continues to trace the same track repeatedly. In this manner, information of a record position on the disc of the picture data written in the field memory 16 is held as the count of the counter 32 or jump position of the laser beam spot so that still picture shifting frame by frame from this position is made possible.

A counter 36 which constitutes recorded data angle detection means detects an angle of recording on the disc of the picture data written in the field memory 16 for performing a fast/slow playback or a still picture shifting in a backward direction. The counter 36 is enabled by the write field start timing signal produced by the writing system timing control circuit 26 to count the FG pulse and is reset by the write field end timing signal, with the last count value being latched by a latch circuit 38. The value latched by this latch circuit 38 corresponds to the angle amount of recorded data on the disc of the picture data written in the field memory 16. This value is large at the innermost circumference and small at the outermost circumference.

The system controller 34 performs various controls including a still picture playback and a still picture shifting. The system controller 34 further provides the writing system timing control circuit 26 with a window for providing a timing for receiving the vertical synchronizing signal. The writing system timing control circuit 26 starts the writing control for the field memory 16 at a timing at which the vertical synchronizing signal is obtained in this window.

Figure 2:
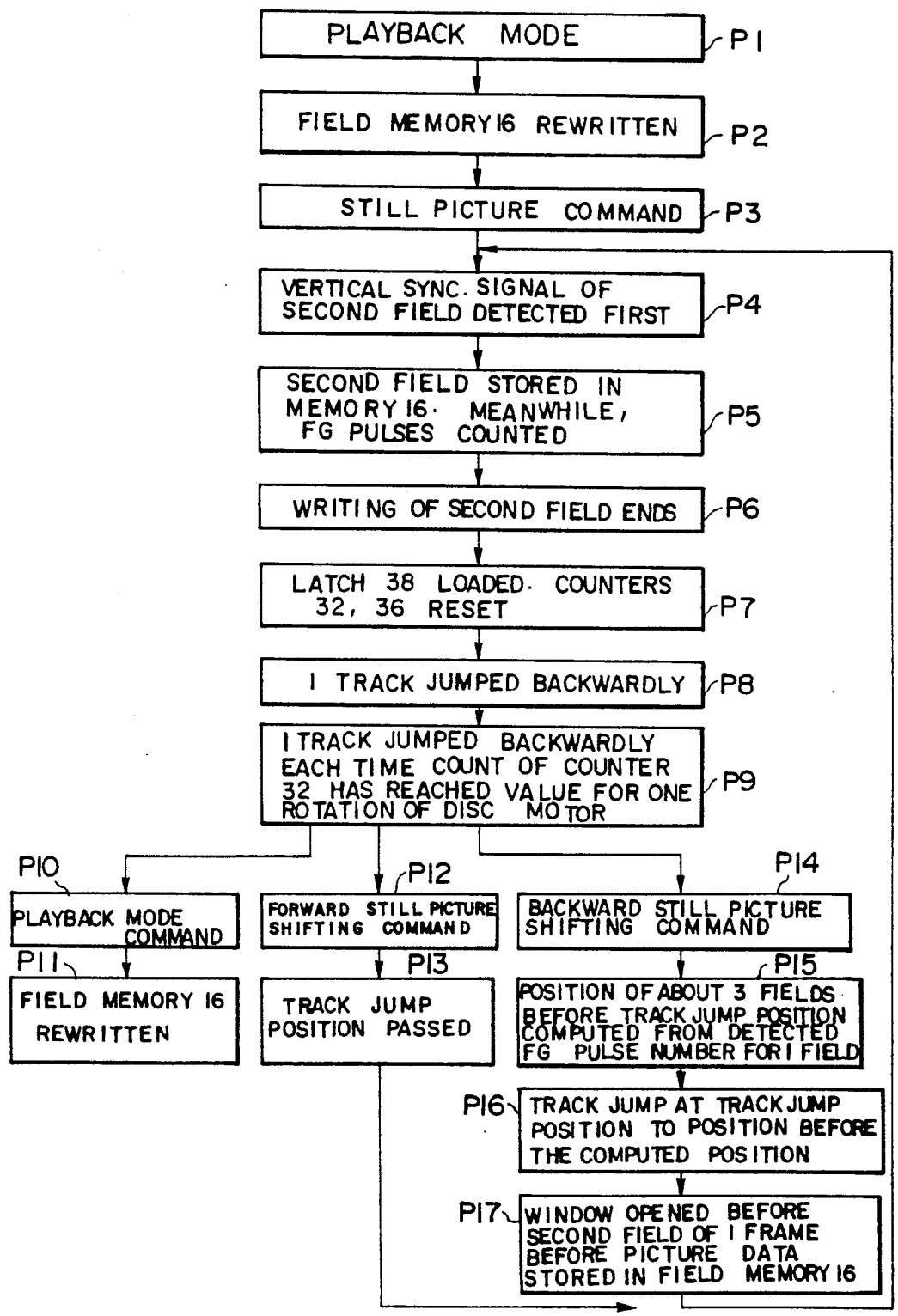
FIG. 2 is a flow chart for explaining the operation of the device shown in FIG. 1.

The still picture playback and still picture shifting operations in the device of FIG. 1 are shown in the flow chart of FIG. 2. In the playback mode (P1), the vertical synchronizing signal receiving window is always opened and the contents of the field memory 16 are rewritten by a reproduced signal applied thereto (P2). Upon receipt of a still picture command by operation on the operation panel by the user (P3), the writing system timing control circuit 26 detects a vertical synchronzing signal of the second field which is obtained first (P4). The vertical synchronizing of the second field signal can be distinguished by utilizing the fact that a signal pattern of a vertical interval is different between the first field and the second field.

Upon detection of the vertical synchronizing signal of the second field, the picture data of the second field is written in the field memory 16. Simultaneously, the vertical synchronizing signal receiving window is closed and writing in the field memory 16 thereafter is stopped. While picture data is written in the field memory 16, the counter 36 detects the angle amount of recorded data on the disc in this field (P5).

Upon completion of writing of the picture data (P6), the count of the counter 36 at this time is latched by the latch circuit 38 to reset the counters 32 and 36 (P7). Upon resetting of the counter 32, the system controller 34 produces a track jump command to cause the laser beam spot to jump one track toward the innermost circumference (P8). Thereafter, each time the count of the counter 32 has reached a count corresponding to one rotation of the disc motor, track jump by one track toward the innermost circumference is repeated (P9) whereby tracing of the same track is repeated.

If a playback mode command is given thereafter (P10), the vertical synchronizing signal receiving window is opened and a vertical synchronizing signal in an input reproduced signal is detected to rewrite the contents of the field memory 16 (P11).

If a still picture shifting command in a forward direction is given (P12) in the still picture playback mode (P9), the laser beam spot does not make a track jump at the track jump position in the still picture playback mode but passes by this position (P13). The vertical synchronizing signal receiving window is opened and a vertical synchronizing of the second field obtained for the first time thereafter is detected (P4) and the contents of the field memory 16 are rewritten to the picture data of this field (P5). At this time, the vertical synchronizing signal receiving window is closed and rewriting of the field memory 16 thereafter is prohibited. In this manner, still picture shifting in a forward direction is made each time a still picture shifting command in a forward direction is given.

If a still picture shifting command in a backward direction is given (P14) in the still picture playback mode (P9), the system controller 34 detects a position which is four fields before the track jump position in the still picture playback (a position three fields before normally suffices but in this case this position is adopted having regards to movie-film-to-television conversion) on the basis of the value latched by the latch circuit 36 (P15). Upon reaching the track jump position in the still picture playback mode, the number of tracks from the track jump position to a position which is before the detected position is calculated and track jump by this calculated number is made (P16).

This track jump number T is given, for example, by the formula $$T \geq [P/R] + 1 \quad (1)$$

where
P represents the number of FG pulses for one field latched by the latch circuit 38 and
R represents the number of FG pulses for one rotation of the disc motor.

(track jump of a somewhat larger track jump number is preferable in view of time required until the time base servo is locked). Upon performing of the track jump, trace position of the laser beam spot is detected by the track jump number and the count of the counter 32 so that the system controller 34 opens the vertical synchronizing receiving window at a position before the second field of a position on the disc at which picture data of one frame before picture data stored in the field memory 16 is recorded (P17). A vertical synchronizing signal of the second field obtained for the first time thereafter is detected (P4) and the contents of the field memory 16 are rewritten to the picture data of this field (P5). At this time, the vertical synchronizing signal receiving window is closed and rewriting of the field memory 16 thereafter is prohibited. In this manner, still picture shifting frame by frame is made each time a still picture shifting command in a backward direction is given.

Figure 3:
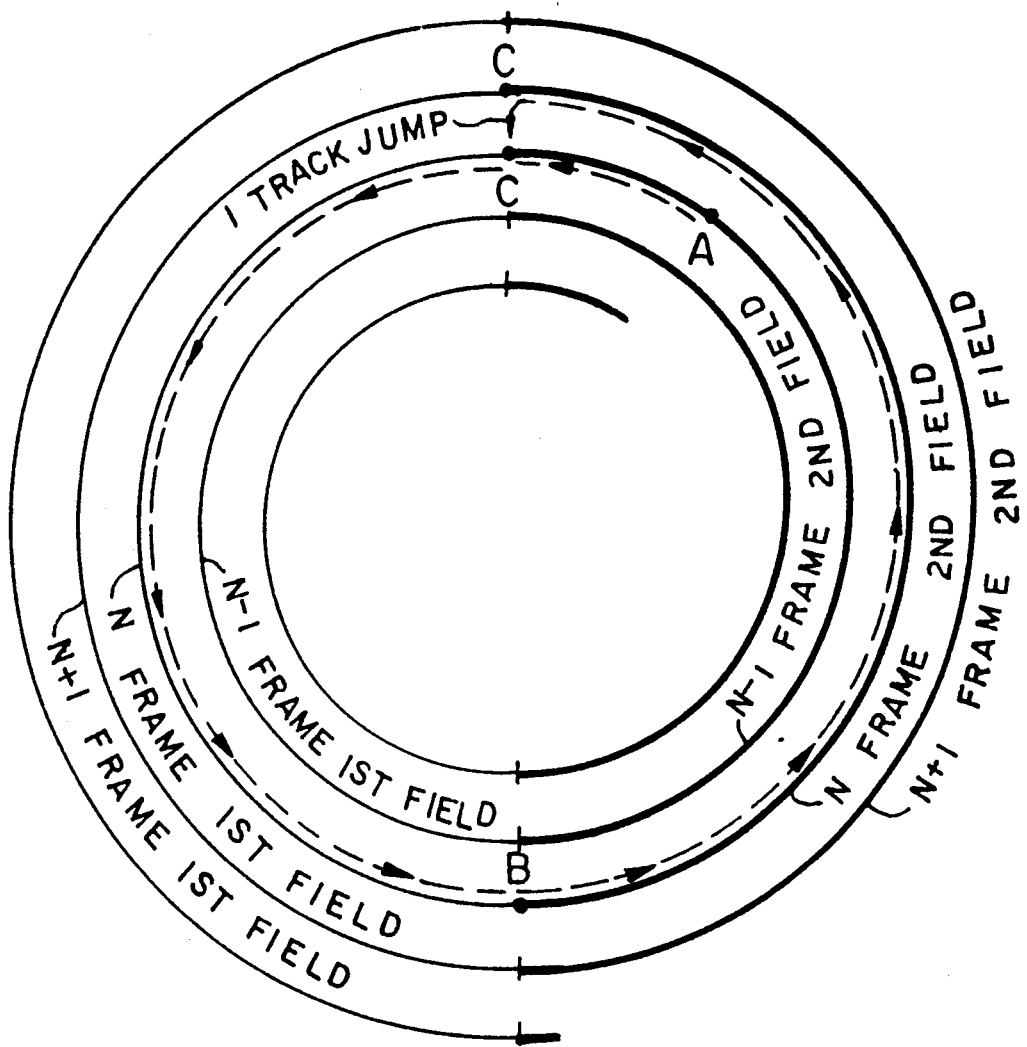
Figure 4:
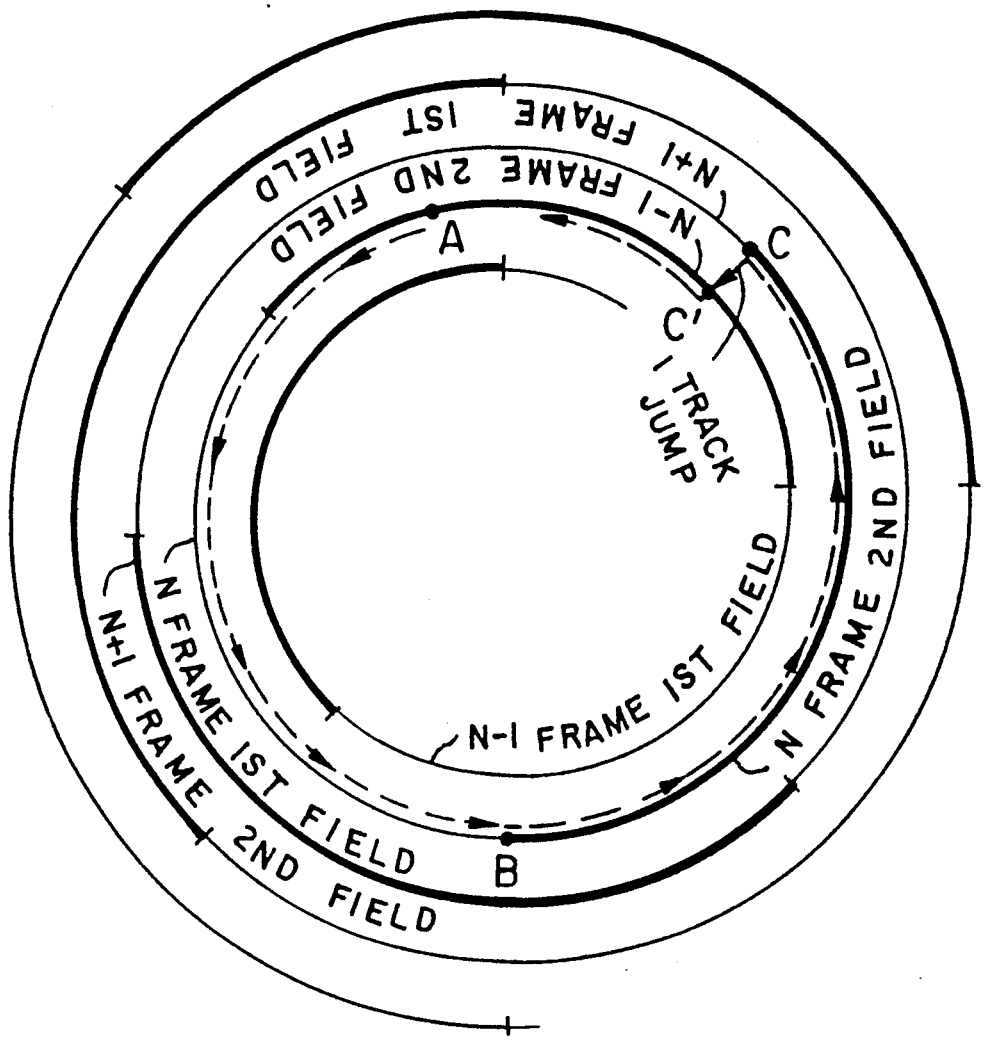
Figure 5:
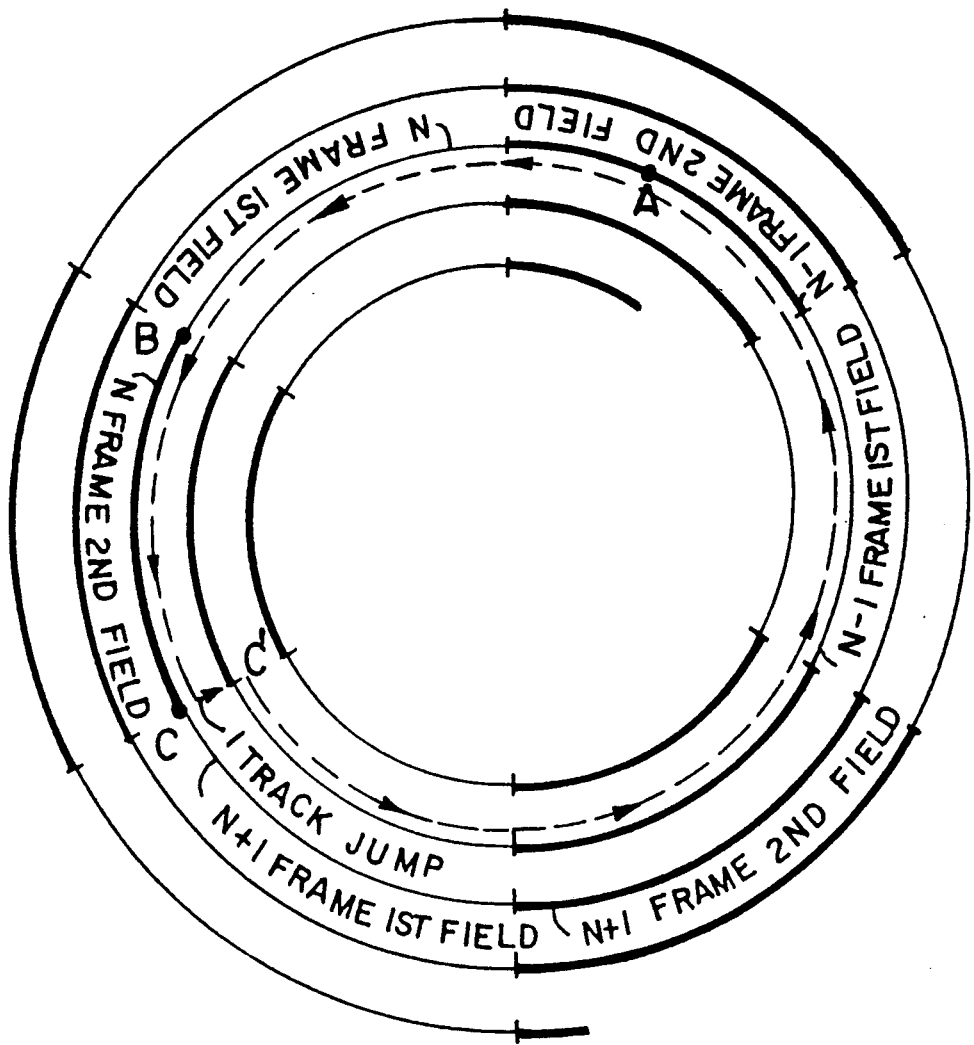

A specific example of the operation mode according to the above described control will now be described. FIGS. 3 to 5 show a state of tracing in the still picture playback mode in an LV of a CLV disc type. FIG. 3 shows a still picture playback state at the innermost circumference position of the disc (one frame per one circumference). A still picture playback command is given at point A in the playback mode and a vertical synchronizing signal of the second field of N frame is detected for the first time at point B. Thereupon, the vertical synchronizing signal receiving window is closed and picture data of this field is written in the field memory 16. Writing is finished at point C at which the second field of N frame ends. During the still picture playback mode, each time the laser beam spot reaches this point C, the laser beam spot jumps to point C' which is one track toward the innermost circumference thereby repeating tracing of the same track via the route of C', B, C and C'.

FIG. 4 shows a still picture playback state at the middle portion of the disc and FIG. 5 shows a still picture playback state at the outermost circumference of the disc (three frames per one circumference). In the same manner as in FIG. 3, if a still picture playback command is given at point A, a vertical synchronizing signal of the second field of N frame is detected for the first time at point B and picture data of the second field of N frame from point B to point C is written in the field memory 16. The laser beam spot jumps at point C to point C' which is one track toward the innermost circumference to repeat tracing of the same track via a route of C', B, C and C'.

Figure 6:
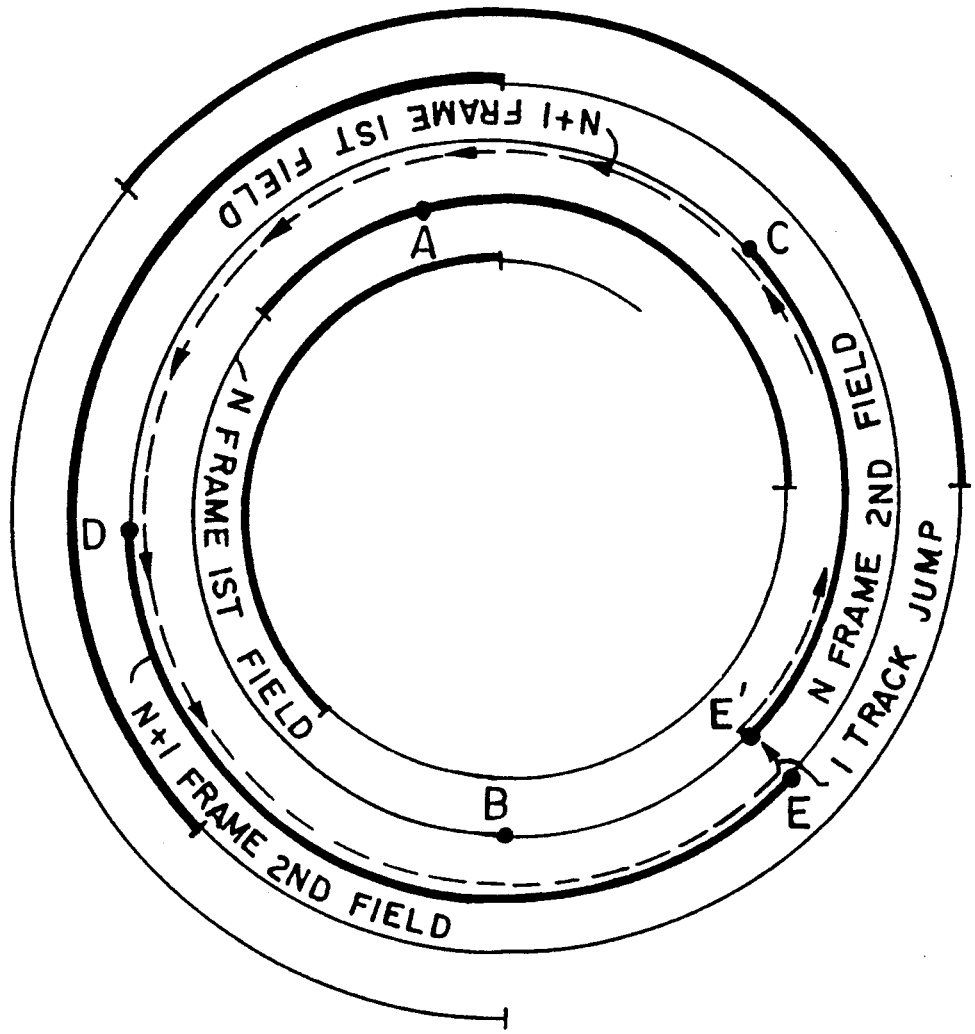
FIG. 6 is a diagram showing the tracing operation of a laser beam spot when a still picture shifting command in a forward direction has been given in the still picture playback mode of FIG. 4.

FIG. 6 shows the operation of a still picture shifting in a forward direction from the still picture playback mode. If a still picture shifting command in a forward direction is given, the laser beam spot does not perform track jump at point C but passes by this point. The vertical synchronizing signal receiving window is opened to receive a vertical synchronizing signal of the second field of N+1 frame obtained for the first time at point D. The contents of the field memory 16 are rewritten to the picture data of the second field of N+1 frame from point D to point E at which this field ends. Writing is finished at point E and the laser beam spot jumps to point E' which is one track toward the innermost circumference and repeats tracing of the same track via a route of E', C, D, E and E'.

Figure 7:
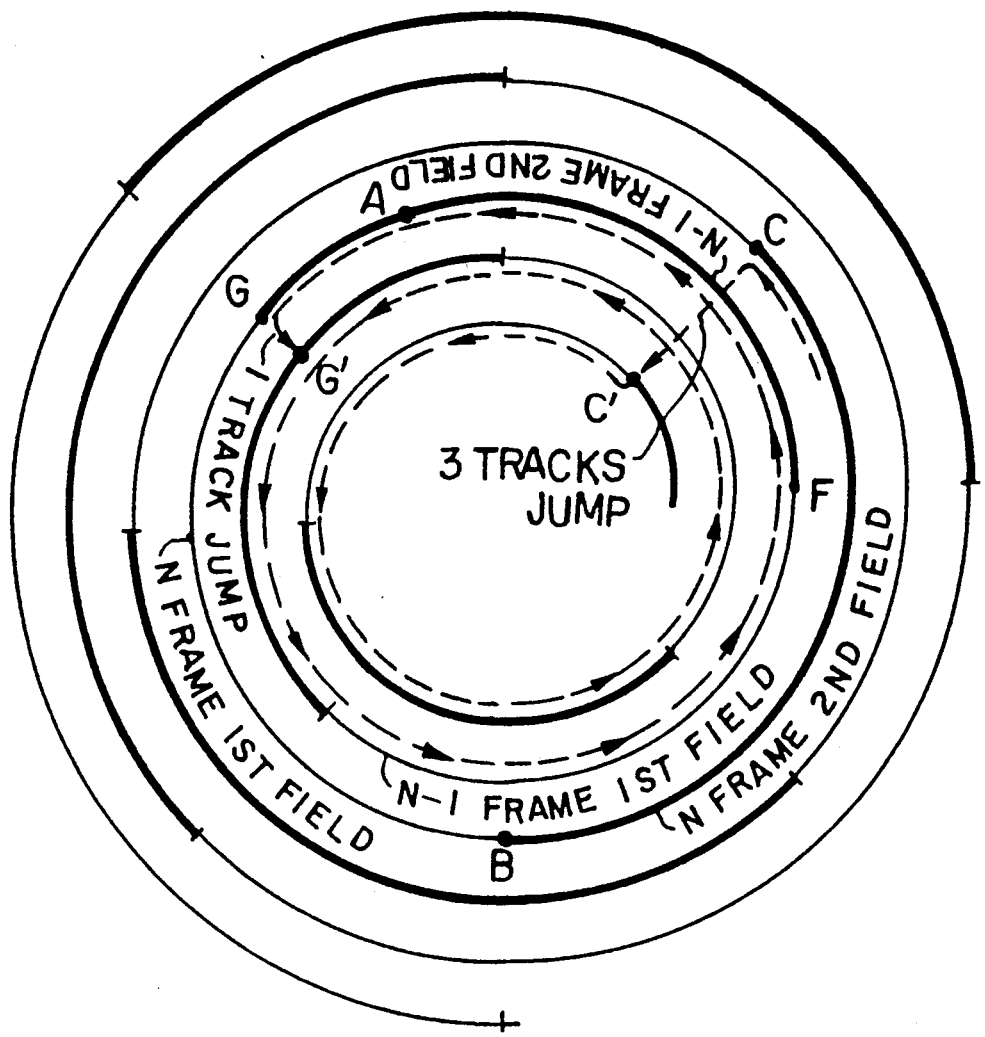
FIG. 7 is a diagram showing the tracing operation of a laser beam spot when a still picture shifting command in a backward direction has been given in the still picture playback mode of FIG. 4.

FIG. 7 shows the operation of a still picture shifting in a backward direction from the still picture playback mode. If a still picture shifting command in a backward direction is given, the system controller 34 determines track jump number T by executing the above described formula (1). In the example of FIG. 7, P/R = ⅔ so that N can be made 3. Accordingly, track jump is made by three tracks at point C to point C" toward the innermost circumference. Upon reaching a position detected by the number of track jump at point C and the count of the FG pulses from point C", i.e., count of the counter 32) which is slightly before a start position F of picture data of the second field of N−1 frame which is one frame before the second field of N frame whereof data is presently stored in the field memory 16 (this position F is determined by the position at point C and the number of FG pulses of one field latched by the latch circuit 38), the vertical synchronizing signal receiving window is opened to detect a vertical synchronizing signal of the second field of N−1 frame. The contents of the field memory 16 are rewritten to picture data of the second field of N−1 frame from F to point G. Writing is finished at point G and the laser beam spot jumps to point G' which is one track toward the innermost circumference to repeat tracing of the same track via a route of G', G, F and G'.

Figure 8:
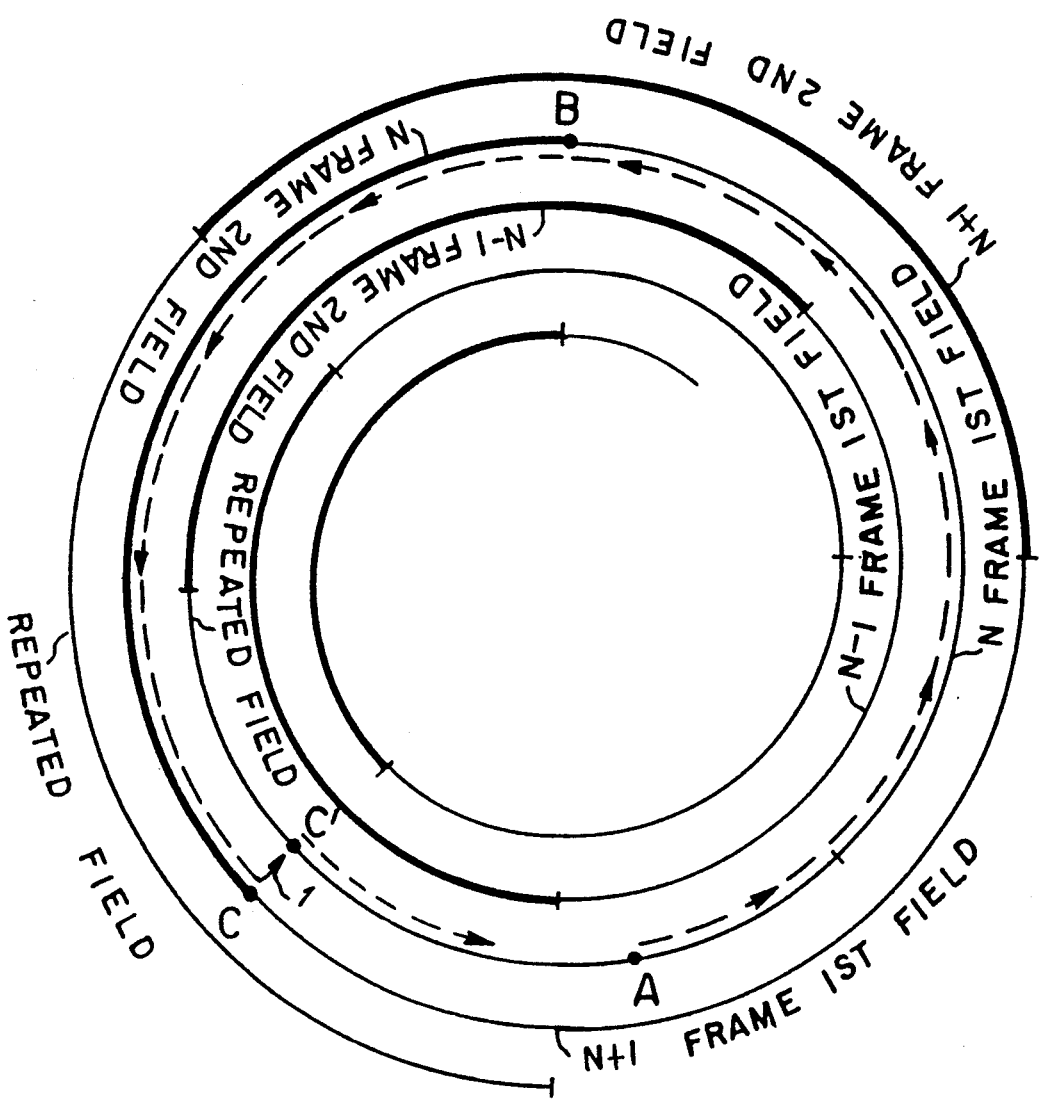
Figure 9:
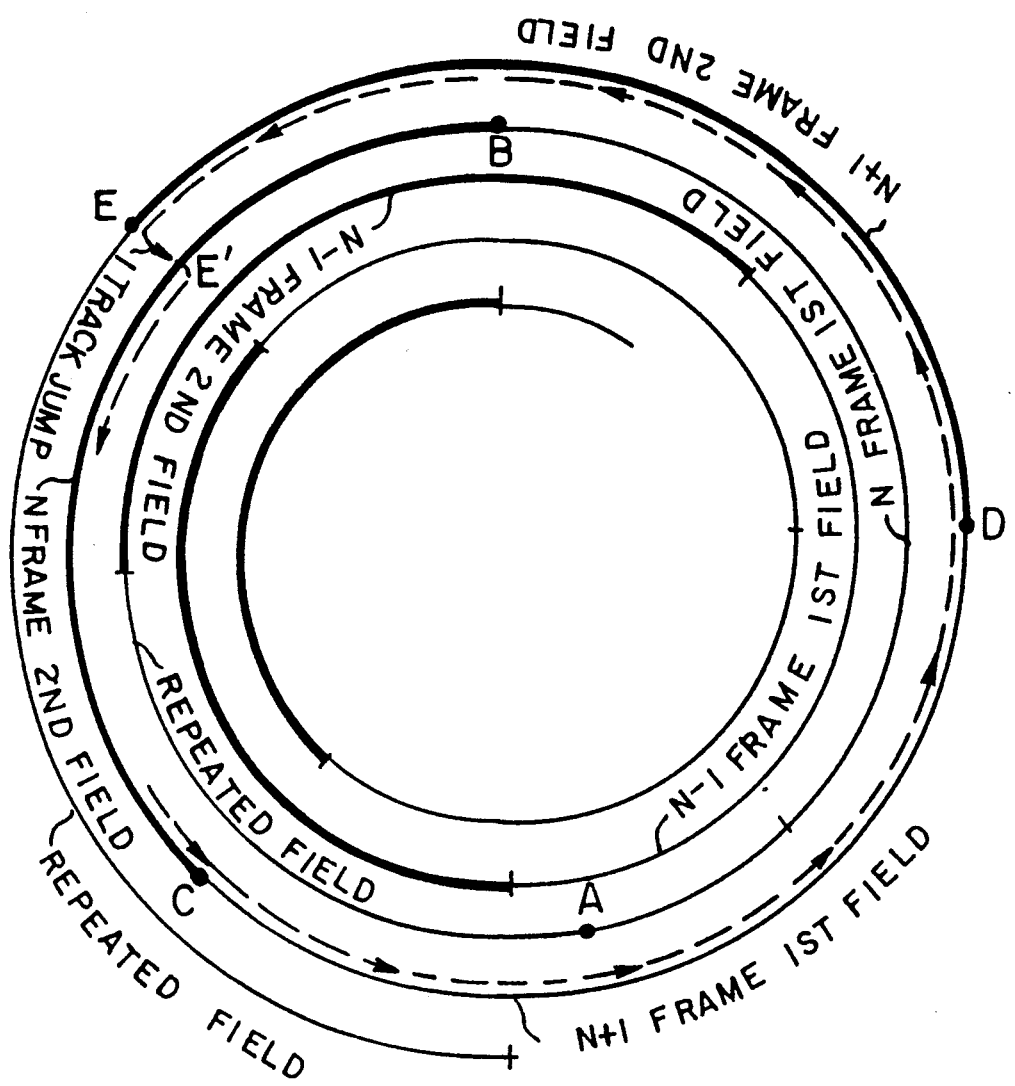
Figure 10:
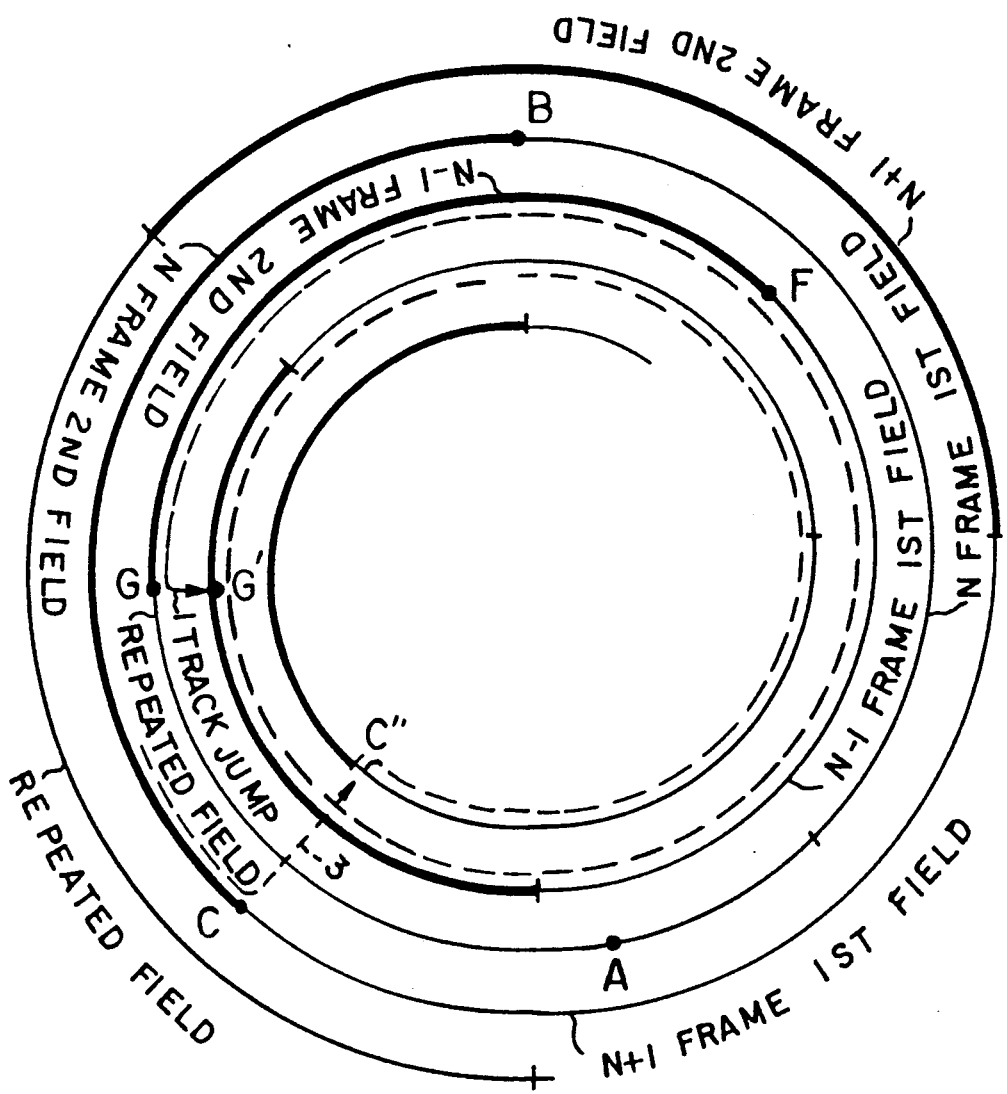

FIGS. 8 to 10 show an example of an LV of CLV disc type in which picture data of the movie film is recorded after being converted to picture data of the television. For converting picture data of a movie film which has 24 frames per second to picture data of the television which has 30 frames per second in the movie to television conversion, one field is added every other frame in data of the television picture and picture of a preceding field is repeatedly recorded only once (i.e., converted to five-fields-two-frames). A field for repeated recording is provided respectively after the second field of N−1 frame and the second field of N+1 frame.

FIG. 8 shows a still picture playback state. A still picture playback command is given at point A and a vertical synchronizing signal of the second field of N frame is received at point B. Picture data of the second field of N frame from point B to point C is written in the field memory 16. The laser beam spot jumps at point C to point C' which is one track toward the innermost circumference and thereafter repeats tracing of the same track via a route of C', B, C and C'.

FIG. 9 shows the operation when a still picture shifting command in a forward direction is given in the still picture playback mode in FIG. 8. The laser beam spot does not jump at point C but continues tracing. Upon detection of a vertical synchronizing signal of the second field of N+1 frame obtained for the first time at point D, picture data of the second field of N+1 frame from point D to point E is written in the field memory 16. At point E, the laser beam spot jumps to point E' which is one track toward the innermost circumference and repeats tracing of the same track via a route of E', C, D, E and E'.

FIG. 10 shows the operation when a still picture shifting command in a backward direction is given in the still picture playback mode of FIG. 8. At point C, the laser beam spot jumps to point C″ which is three tracks toward the innermost circumference. The vertical synchronizing signal receiving window is opened before the second field of N−1 frame to receive a vertical synchronizing signal of the second field of N−1 frame at point F. The contents of the field memory 16 are rewritten to picture data of the second field of N−1 frame at point F. At point G, the laser beam spot jumps at point G to point G′ which is one track toward the innermost circumference and repeats tracing of the same track via a route of G′, F, G and G′. In the above described manner, a still picture playback and still picture shifting are made possible in a disc containing picture data converted from a movie film to television.

Embodiment 2

Figure 11:
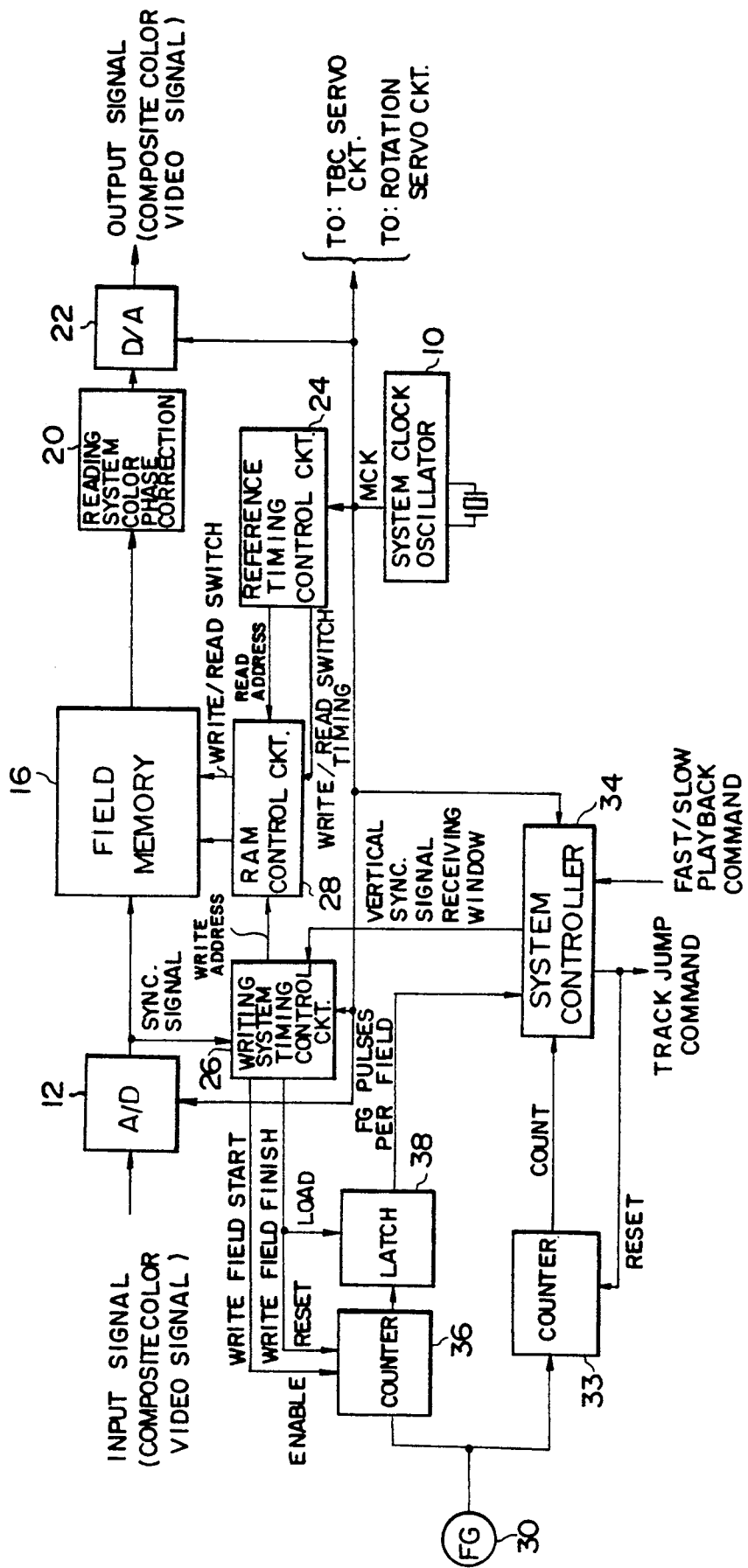
FIG. 11 is a block diagram showing an embodiment of the invention for performing a fast/slow playback.

An embodiment of the invention for performing a fast/slow playback is shown in FIG. 11. Through these figures, the same component parts are designated by the same reference numerals and description thereof will be omitted.

In a fast/slow playback, the writing system timing control circuit 26 counts a master clock MCK using a vertical synchronizing signal detected for the first time after jump and supplies the count as a write address for one field. Thereafter, writing of picture data is suspended until detecting a first synchronizing signal is detected after next jump.

A counter 33 is reset by a track jump command and detects an amount of rotation from the track jump by counting the output pulse of the FG 30.

A system controller 34 performs various controls including a normal playback and a fast/slow playback. The system controller 34 also provides to the writing system timing control circuit 26 a window which provides a timing for receiving a vertical synchronizing signal. The writing system timing control circuit 26 starts writing control for the field memory 16 at a timing at which the vertical synchronizing signal has been received in this window. During a fast/slow playback mode, the window is opened after jump and closed when a first vertical synchronizing signal has been received. The system controller 34 further performs a function as jump control means during the fast/slow playback mode. The system controller 34 computes respectively, in accordance with angle amount of recorded data information for one field which is latched by the latch circuit 38, trace angle amount necessary for reading one picture data from the optical disc and track jump amount necessary for realizing a multiplying number of fast/slow playback speed set on the basis of this trace angle amount and, when the computed trace angle amount has been detected by the count of the counter 33, produces a command for jumping the computed track jump amount.

Multiplying number S of fast/slow playback speed is represented by the formula $$S = \frac{RN + P}{P}$$

where
P represents trace angle amount for one tracing,
N represents track jump amount for one jump and
R represents trace angle amount for one rotation.

Examples of combination of the multiplying number S of fast/slow playback speed, trace angle amount P for one tracing and track jump amount N for one jump are shown in the following Table 1. In this example, the trace angle amount P is represented by the number of FG pulses detected by the counter 33. (The number of FG pulses for one rotation of the disc motor)

TABLE 1

| Fast/slow playback mode | Multiplying number of fast/slow playback speed S (-fold) | Trace angle amount P (Pulse) | Track jump amount N (tracks) |
| --- | --- | --- | --- |
| Forward slow | ½ | 80 | −1 |
|  |  | 160 | −2 |
|  | ⅓ | 120 | −1 |
|  |  | 240 | −2 |
| Forward fast | 2 | 60 | +1 |
|  |  | 120 | +2 |
|  | 3 | 30 | +1 |
|  |  | 60 | +2 |
|  |  | 90 | +3 |
| Backward slow | −½ | 48 | −1 |
|  |  | 96 | −2 |
|  | −⅓ | 40 | −1 |
|  |  | 80 | −2 |
| Backward 1-fold | −1 | 30 | −1 |
| Backward fast | −2 | 20 | −1 |
|  |  | 40 | −2 |
|  | −3 | 15 | −1 |
|  |  | 30 | −2 |

As the trace angle amount necessary for reading one picture data, minimum of two fields are necessary for reading either one field. The trace angle amount is an amount of these two fields plus a period of time required for stabilizing of the time base servo after jump. In a CLV disc, angle amount of recorded data for one field differs between circumferences, i.e., it is large in the innermost circumference and small in the outermost circumference. The trace angle amount necessary for reading one field therefore increases toward the innermost circumference and decreases toward the outermost circumference. The system controller 34 therefore determines trace angle amount so as to satisfy necessary trace angle amount corresponding to a detected angle amount of recorded data for one field and computes a track jump amount necessary for realizing the designated multiplying number of fast/slow playback speed on the basis of this trace angle amount and issues a track jump command on the basis of these data. In the case of forward treble speed fast playback, for example, the trace angle amount P for one tracing and the track jump amount N for one jumping can be determined in accordance with the necessary trace angle amount Q as shown in the following Table 2.

TABLE 2

| Necessary trace angle amount Q (pulse) | Trace angle amount P (pulse) | Track jump amount (tracks) |
| --- | --- | --- |
| Q ≦ 30 | 30 | +1 |
| 30 < Q ≦ 60 | 60 | +2 |
| 60 < Q ≦ 90 | 90 | +3 |

Figure 13:
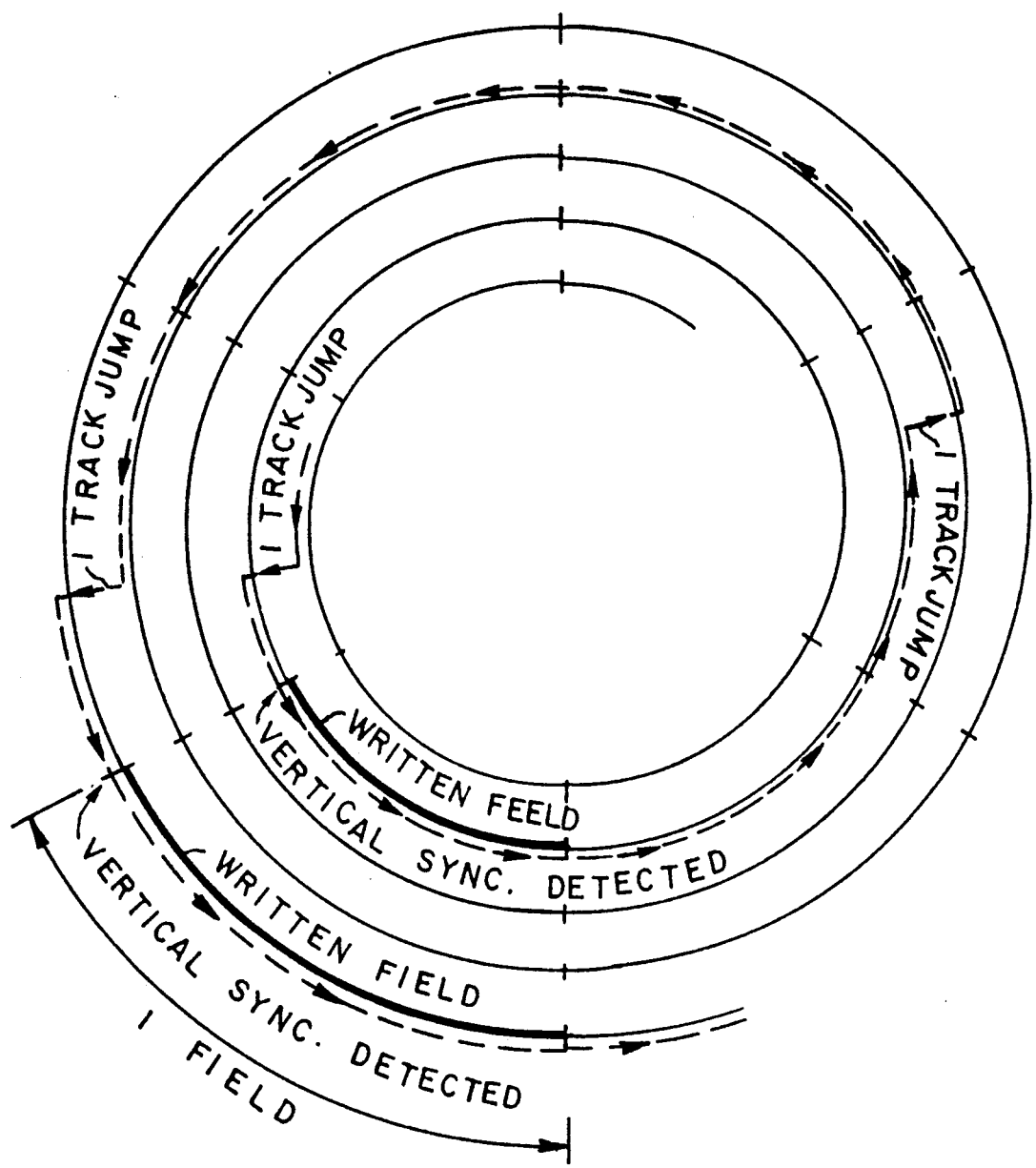
Figure 14:
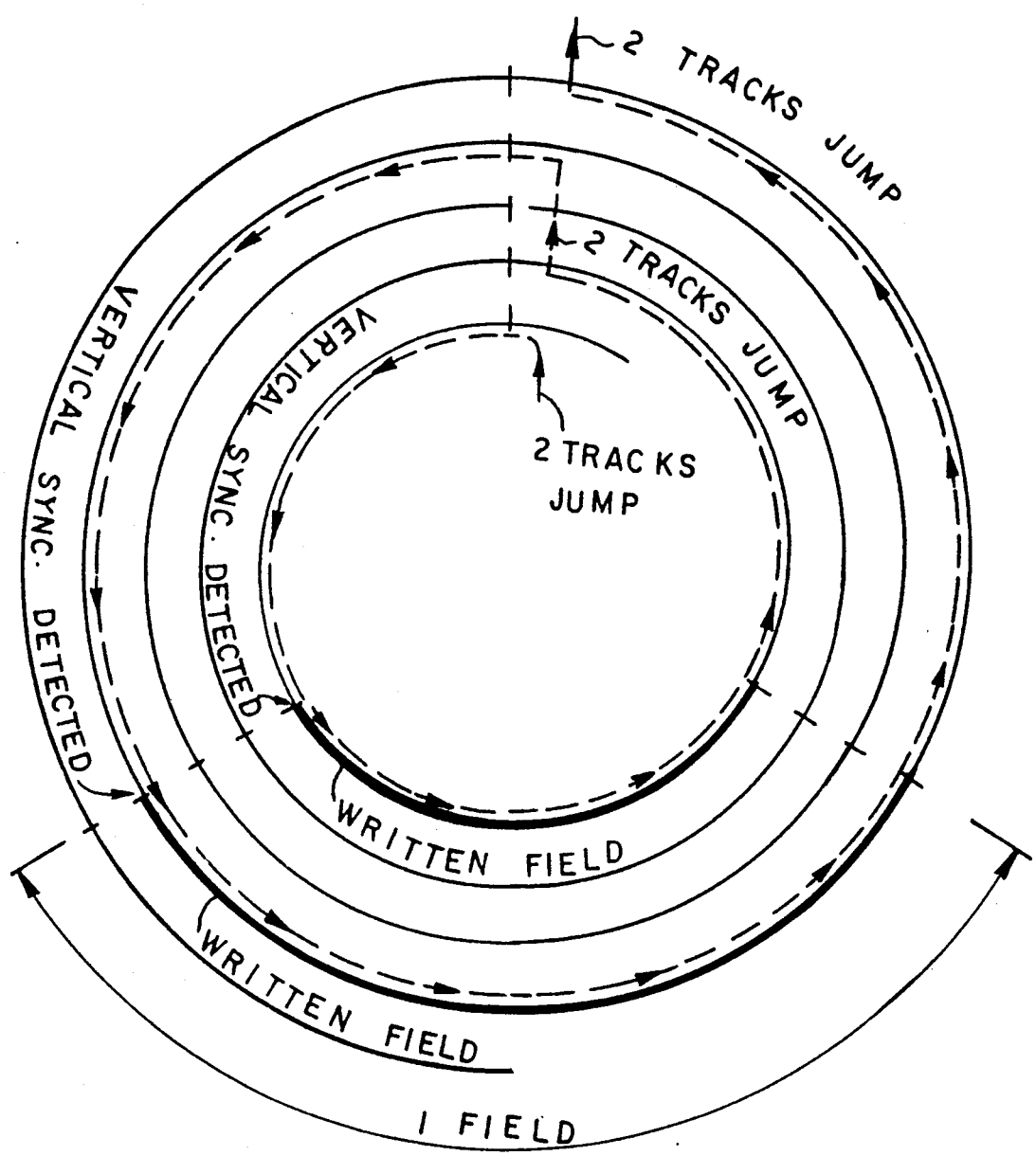
Figure 15:
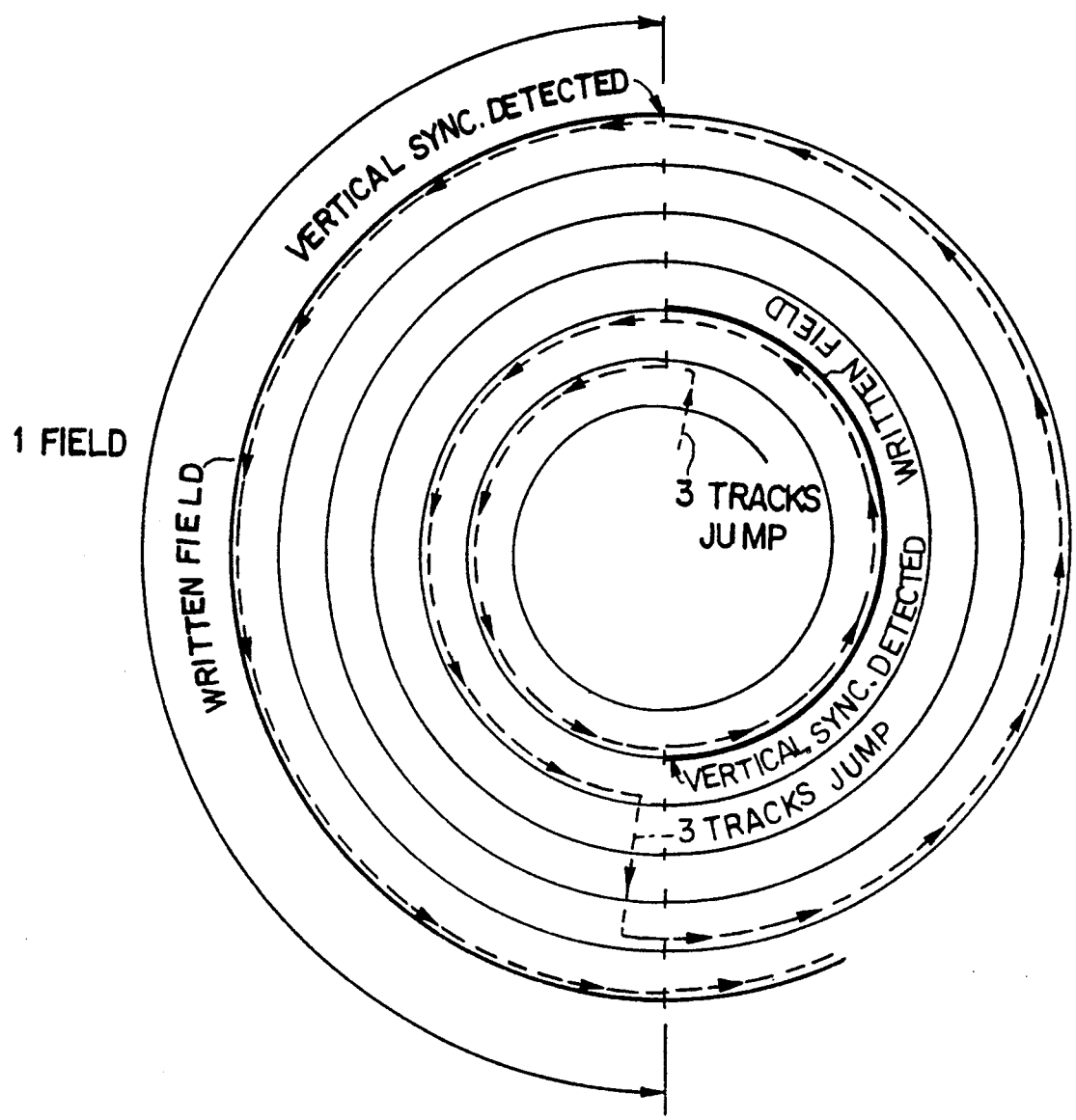

The trace angle amount Q≦30 applies to a case where the outermost circumference is traced. In this tracing state, as shown in FIG. 13, the laser beam spot jumps one track every half rotation. The trace angle amount 30<Q≦60 applies to a case where the middle portion of the disc is traced. In this tracing state, as shown in FIG. 14, the laser beam spot jumps two tracks every rotation. The trace angle amount 60<Q≦90 applies to a case where the innermost circumference is traced. In this tracing state, as shown in FIG. 15, the laser beam spot jumps three tracks every one and half rotation. In either case, picture data of a field in which a vertical synchronizing signal is detected for the first time after the track jump is written in the field memory 16 and this picture data is repeatedly read out unitl new picture data is written after a next jump.

Figure 12:
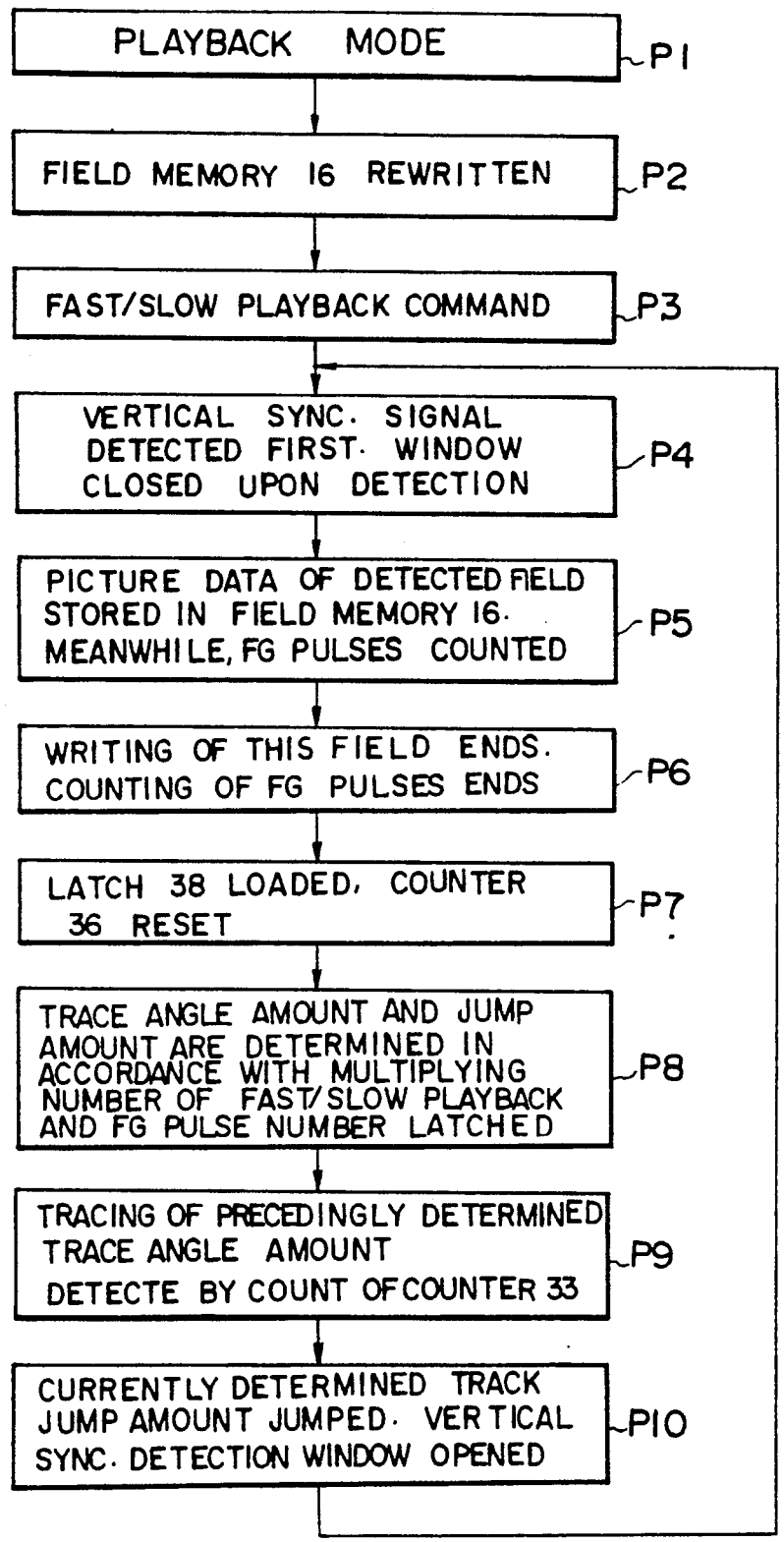
FIG. 12 is a flow chart for explaining the operation of the device shown in FIG. 11.

The operation of the fast/slow playback by the embodiment of FIG. 11 is shown in FIG. 12. In the playback mode (P1), the vertical synchronizing signal receiving window is always opened and the contents of the field memory 16 are rewritten by an input reproduced signal (P2). Upon receipt of a fast/slow playback command by operation on the operation panel by the user, given (P3), the writing system timing control circuit 26 detects a vertical synchronizing signal obtained for the first time thereafter (P4).

Upon detection of a vertical synchronizing signal, picture data of this field is written in the field memory 16. The vertical synchronizing signal receiving window is closed thereby prohibiting writing in the field memory 16 thereafter. While picture data is written in the field memory 16, the counter 36 detects angle amount of recorded data angle of this field on the disc (P5).

Upon finishing of writing of this picture data (P6), the count of the counter 36 is latched by the latch circuit 38 to reset the counters 32 and 36 (P7). The system controller 34 determines the trace angle amount and the track jump amount as shown, for example, in Table 2 in accordance with the number of FG pulses for one field latched by the latch circuit 38 and the set multiplying number of fast/slow playback speed (P8).

Thereafter, upon detection of the fact that the trace angle amount determined by the preceding tracing has been traced from the count of the counter 33 (P9), the optical pickup jumps the currently determined track jump amount (P10). Since a preceding trace angle amount has not been determined in the first interval after the fast/slow playback command was given, the processing proceeds from the steps P8 in which the trace angle amount and track jump amount are determined to the step P10 for track jump directly without executing the processing in the step P9.

Upon finishing track jump, the processing returns to the step P4 and the above described operation is repeated.

In the above described embodiments, the picture data of the second field is used as the data written in the field memory in the still picture playback, still picture shifting or fast/slow playback. Alternatively, picture data of the first field may be used. Alternatively further, data of two fields of one frame may be written.

In the above described embodiments, description has been made about a case where the present invention is applied to playback of an LV. The invention is also applicable to a CDV player and various other optical disc playback devices for reproducing picture data.

What is claimed is:
1. An optical disc playback device comprising:
    a picture memory storing picture data reproduced from an optical disc;
    memory control means for storing, when a still picture command has been given, picture data which is being reproduced in said picture memory and reading out the stored picture data repeatedly;
    rotation signal generation means for generating, at a predetermined interval, a predetermined number of signals for each rotation of a disc motor coupled to the optical disc, said predetermined interval corresponding to a rotation angle determined by dividing a rotation of the disc motor into a predetermined number of equal rotational increments;
    a system control means for detecting, when the still picture command has been given, a record position on the optical disc at which the picture data stored in said picture memory is recorded, and supplying a jump pulse to a tracking actuator of an optical pickup each time a position on the optical disc which has a specific relation with the record position has been detected in response to the signal generated by said rotation signal generation means, thereby to cause a beam spot to jump a predetermined number of tracks in a backward direction; and
    recorded data angle amount detection means for detecting, in response to the signal generated by said rotation signal generation means, an angle amount of recording on the optical disc of the picture data stored in said picture memory in the still picture playback mode;
    said system control means detecting, when a still picture shifting command in a backward direction has been given, a position on the optical disc at which a forward picture data of one frame before the picture data stored in said picture memory is recorded from the detected recorded data angle amount to cause the optical pickup to perform track jump to a position before said position, and said memory control means storing the forward picture data in said picture memory and reading out the stored forward picture data repeatedly upon reaching the recorded position of the forward picture data.

2. An optical disc playback device as defined in claim 1 wherein said optical disc is of a constant linear velocity disc type.

3. An optical disc playback device as defined in claim 2, wherein movie film-to-television converted data is recorded on said optical disc.

4. An optical disc playback device as defined in claim 1, wherein:
    the memory control means stores, when a fast/slow playback command has been given, picture data which is reproduced at each track jump in said picture memory and reads out stored picture data repeatedly;
    the recorded data angle amount detection means detects, when the fast/slow playback command has been given, recorded data angle amount on the optical disc of the picture data stored in said picture memory in response to the signal generated by said rotation signal generation means; and
    the system control means computes, in accordance with the detected recorded data angle amount, a trace angle amount necessary for reading one picture data from the optical disc and a track jump amount necessary for achieving a multiplying number of playback speed set on the basis of the trace angle amount and, when the computed trace angle amount has been detected by said recorded data angle amount detection means, causes an optical pickup to jump the computed track jump amount.

5. An optical disc playback device as defined in claim 4, wherein said optical disc is of a constant linear velocity disc type.

6. An optical disc playback device as defined in claim 5, wherein movie-to-television converted data is recorded on said optical disc.

7. An optical disc playback device comprising:
- a picture memory storing picture data reproduced from an optical disc;
- memory control means for storing, when a still picture command has been given, picture data which is being reproduced in said picture memory and reading out the stored picture data repeatedly;
- rotation signal generation means for generating, at a predetermined interval, a predetermined number of signals for each rotation of a disc motor coupled to the optical disc, said predetermined interval corresponding to a rotation angle determined by dividing a rotation of the disc motor into a predetermined number of equal rotational increments;
- a system control means for detecting, when the still picture command has been given, a record position on the optical disc at which the picture data stored in said picture memory is recorded, and supplying a jump pulse to a tracking actuator of an optical pickup each time a position on the optical disc which has a specific relation with the record position has been detected in response to the signal generated by said rotation signal generation means, thereby to cause a beam spot to jump a predetermined number of tracks in a backward direction;
- said system control means detecting, when a still picture shifting command in a forward direction has been given in a still picture playback mode, a position on the optical disc at which backward picture data which is one frame after the picture data stored in said picture memory is recorded in response to the signal generated by said rotation signal generation means and said memory control means storing the backward picture data in said picture memory and reading out the stored backward picture data repeatedly; and
- recorded data angle amount detection means for detecting, in response to the signal generated by said rotation signal generation means, an angle amount of recording on the optical disc of the picture data stored in said picture memory in the still picture playback mode;
- said system control means detecting, when a still picture shifting command in a backward direction has been given, a position on the optical disc at which a forward picture data of one frame before the picture data stored in said picture memory is recorded from the detected recorded data angle amount to cause the optical pickup to perform track jump to a position before said position, and said memory control means storing the forward picture data in said picture memory and reading out the stored forward picture data repeatedly upon reaching the recorded position of the forward picture data.

* * * * *